(12) United States Patent
Horiuchi et al.

(10) Patent No.: US 7,878,512 B2
(45) Date of Patent: Feb. 1, 2011

(54) ALIGNMENT CHANGING CONTROL DEVICE

(75) Inventors: Yutaka Horiuchi, Wako (JP); Nobuo Sugitani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 215 days.

(21) Appl. No.: 12/035,923

(22) Filed: Feb. 22, 2008

(65) Prior Publication Data
US 2008/0203690 A1  Aug. 28, 2008

(30) Foreign Application Priority Data
Feb. 27, 2007  (JP) ............................. 2007-046459

(51) Int. Cl.
*B62D 5/06* (2006.01)

(52) U.S. Cl. ............... 280/5.522; 280/5.52; 280/5.521; 180/410; 180/411; 180/412; 180/421; 180/422; 180/423; 180/443; 180/446; 701/41; 318/473; 318/783; 318/788; 318/789

(58) Field of Classification Search ........... 180/446, 180/412, 410, 411, 402, 443, 445, 6.28, 6.5, 180/421–423; 701/41; 318/473, 783, 788, 318/798, 800; 280/5.522, 5.52, 5.521, 5.523, 280/5.524

See application file for complete search history.

(56) References Cited

U.S. PATENT DOCUMENTS

| | | | | |
|---|---|---|---|---|
| 4,216,421 A * | 8/1980 | Dupont | ....................... | 318/471 |
| 4,357,565 A * | 11/1982 | Saito et al. | ................... | 318/473 |
| 4,828,283 A * | 5/1989 | Ishii et al. | .................... | 180/415 |
| 5,086,862 A * | 2/1992 | Graber et al. | ............... | 180/422 |
| 5,103,926 A * | 4/1992 | Ohno et al. | .................. | 180/446 |
| 5,143,400 A * | 9/1992 | Miller et al. | ............. | 280/5.522 |
| 5,524,974 A * | 6/1996 | Fischle et al. | ............... | 303/191 |
| 5,831,405 A * | 11/1998 | Massie | ........................ | 318/471 |
| 5,845,045 A * | 12/1998 | Jeske et al. | .................. | 388/804 |
| 6,026,926 A * | 2/2000 | Noro et al. | ................... | 180/446 |
| 6,326,753 B1 * | 12/2001 | Someya et al. | .............. | 318/471 |
| 6,380,706 B1 * | 4/2002 | Kifuku et al. | ............... | 318/434 |
| 6,902,028 B2 * | 6/2005 | Takatsuka et al. | ........... | 180/446 |
| 7,084,593 B2 * | 8/2006 | Crowley | ...................... | 318/432 |
| 7,091,686 B2 * | 8/2006 | Kagei | .......................... | 701/41 |

(Continued)

FOREIGN PATENT DOCUMENTS

DE  101 62 207  12/2002

(Continued)

*Primary Examiner*—Faye M. Fleming
*Assistant Examiner*—James English
(74) *Attorney, Agent, or Firm*—Rankin, Hill & Clark LLP

(57) ABSTRACT

An alignment changing control device that includes: a motor drive section which adjusts electrical power supplied to a motor of the electric actuator according to an operation command and, when receiving an operation inhibiting signal, limits or stops supplying the electrical power to the motor; a motor temperature estimating section for calculating an estimated temperature of the motor from at least a current supplied to the motor, an outside air temperature and a vehicle speed, based on heat balance relationship; and a comparator which transmits the operation inhibiting signal to the motor drive section when the estimated temperature of the motor calculated by the motor temperature estimating section is higher than a predetermined temperature, which is equal to or lower than an operation allowable temperature of the motor.

8 Claims, 6 Drawing Sheets

U.S. PATENT DOCUMENTS

| | | | |
|---|---|---|---|
| 7,112,941 B2 * | 9/2006 | Chrostowski | 318/801 |
| 7,164,248 B2 * | 1/2007 | Hayashi | 318/434 |
| 7,304,447 B2 * | 12/2007 | Hirai et al. | 318/471 |
| 7,439,700 B2 * | 10/2008 | Shimojo et al. | 318/650 |
| 7,463,463 B2 * | 12/2008 | Kobayashi et al. | 361/25 |
| 7,538,992 B2 * | 5/2009 | Bilac et al. | 361/32 |
| 7,621,539 B2 * | 11/2009 | Choi et al. | 280/5.52 |
| 2002/0022912 A1 * | 2/2002 | Urabe et al. | 701/41 |
| 2002/0179363 A1 | 12/2002 | Takatsuka et al. | |
| 2003/0209866 A1 * | 11/2003 | Kwon | 280/5.522 |
| 2005/0116561 A1 * | 6/2005 | Matsubara et al. | 310/83 |
| 2005/0242760 A1 * | 11/2005 | Fujita et al. | 318/434 |
| 2005/0269150 A1 | 12/2005 | Fujimoto et al. | |
| 2006/0090954 A1 * | 5/2006 | Sugitani et al. | 180/446 |
| 2007/0209853 A1 * | 9/2007 | Nakajima | 180/65.5 |
| 2007/0247766 A1 * | 10/2007 | Zeniya et al. | 361/25 |
| 2008/0024080 A1 * | 1/2008 | Ogawa | 318/432 |
| 2008/0230302 A1 * | 9/2008 | Tamaki | 180/443 |
| 2009/0189561 A1 * | 7/2009 | Patel et al. | 318/806 |
| 2009/0200098 A1 * | 8/2009 | Inoue et al. | 180/446 |
| 2009/0276121 A1 * | 11/2009 | Limpibunterng et al. | 701/41 |

FOREIGN PATENT DOCUMENTS

| | | |
|---|---|---|
| DE | 10 2004 057 184 | 1/2006 |
| EP | 1 162 126 | 12/2001 |
| JP | 62-125952 | 6/1987 |
| JP | 04-071379 | 3/1992 |
| JP | 06-247324 | 9/1994 |
| JP | 08-337106 | 12/1996 |
| JP | 2002-195338 | 7/2002 |
| JP | 2004-007970 | 1/2004 |
| JP | 2005-032653 | 2/2005 |
| JP | 2005-238957 | 9/2005 |
| JP | 2006-238552 | 9/2006 |
| JP | 2006-288030 | 10/2006 |
| WO | 03/047950 | 6/2003 |
| WO | 2005/047030 | 5/2005 |

* cited by examiner

ALIGNMENT CHANGING CONTROL DEVICE

CROSS-REFERENCE TO RELATED APPLICATION(S)

This application claims the foreign priority benefit under Title 35, United States Code, §119 (a)-(d), of Japanese Patent Application No. 2007-046459 filed on Feb. 27, 2007 in the Japan Patent Office, the disclosure of which is herein incorporated by reference in its entirety.

BACKGROUND OF THE INVENTION

1. Field of the Invention

The present invention relates to an alignment changing control device for controlling electric actuators which change alignment angles of vehicle wheels.

2. Description of the Related Art

There is conventionally known four-wheel steering vehicles whose rear wheels are steered linking with the steering handle of the vehicle. For example, there is known an all-wheel independent steering device for independently controlling the operation of the alignment angles of all wheels according to the steering angle of the steering handle and the vehicle speed (see Japanese Patent Publication No. Hei 6-47388, FIG. 2 and others).

Since the all-wheel independent steering device disclosed in Japanese Patent Publication No. Hei 6-47388 employs a hydraulic actuator, a hydraulic system needs to be provided separately. In order to suppress increase in weight of the vehicle to reduce the cost, an electric actuator can be alternatively employed, instead of the hydraulic actuator.

In the steering device employing such an electric actuator, in order to protect a motor which supplies power to the electric actuator from being burn out due to the temperature rising mainly caused by Joule heat, it is necessary to measure the temperature of the motor and limit, when the temperature is equal to or higher than a predetermined temperature, the operation of the motor. To serve this purpose, a temperature sensor can be attached to the main body of the motor to measure the temperature of the motor. However, if the temperature sensor is attached to the main body of the motor, noises caused by the motor and the like will be brought into the output signal of the temperature sensor, therefore it becomes difficult to precisely measure the temperature.

To solve this problem, there is provided a controlling circuit in which the temperature of the motor is estimated using a thermal model and based on the current supplied to the motor, and the current supplied to the motor is limited based on the estimated result (see Japanese Patent Laid-Open Publication No. Hei 4-71379, page 10 line 11 to page 11 line 16 and others).

Further, in the electric actuator having such a controlling circuit, when power supplied to the motor is cut off by switching off the ignition switch, it is preferred to also cut of the power supplied to the controlling circuit in order to prevent the battery voltage from dropping. In such a case, the estimated temperature of the motor calculated by the controlling circuit is cleared however. When restarting the vehicle, the controlling circuit estimates the temperature of the motor using a predetermined initial value.

For this reason, when restarting the vehicle and driving the motor shortly after cutting off the power supplied to the motor of the electric actuator while the temperature of the motor is high, a temperature difference is generated between the actual temperature of the motor and the estimated temperature of the motor estimated by the controlling circuit using the initial value, therefore there is a concern that the motor might be burn out.

To solve this problem, there is provided a motor control device in which after the power supplied to the motor is cut off, a cutting off time (which is the time between the time when the power supplied to the motor is cut off and the time when the power of an internal battery is cut off) is calculated based on the estimated temperature of the motor, and the power of an internal battery is cut off after the calculated cutting off time has passed (see Japanese Patent Laid-Open Publication No. Hei 6-247324, claim 1, etc.).

With such a configuration, the estimated temperature can be saved until the temperature of the motor is dropped to an operation allowable temperature, and therefore even when the motor is restarted shortly after stop, the operation of the motor can be limited based on the estimated temperature, so that the motor can be prevented from burning out.

However, if the controlling circuit disclosed in Japanese Patent Laid-Open Publication No. Hei 4-71379 is applied to an electric actuator installed to a moving object such as the vehicle in a state exposed to the outside-air, since the flow of air around the electric actuator is not taken into consideration, the estimated temperature of the motor is higher than the actual temperature of the motor, and therefore the operation of the electric actuator can not be optimally limited, and the optimum electric actuator can not be selected.

Further, in the motor control device disclosed in Japanese Patent Laid-Open Publication No. Hei 6-247324, since it is necessary to provide hardware for calculating the cutting off time and to newly provide an internal battery within the motor control device, the motor control device will have a complicated structure and high cost.

SUMMARY OF THE INVENTION

A first object of the present invention is to provide an alignment changing control device capable of precisely estimating the temperature of an electric actuator based on the movement characteristic of a moving object.

A second object of the present invention is to provide an alignment changing control device capable of preventing a motor from burning out even when the motor is restarted shortly after stop, and capable of simplifying the configuration of hardware.

To achieve the first object of the present invention, an alignment changing control device according to a first aspect of the present invention is provided for controlling the driving of an electric actuator which changes the alignment angle of wheels of a vehicle, the electric actuator being mounted on the vehicle and exposed to the outside air. The alignment changing control device comprising; a motor drive section which adjusts electrical power supplied to a motor of the electric actuator according to an operation command from outside and, when receiving an operation inhibiting signal, limits or stops supplying the electrical power to the motor. The alignment changing control device further comprising a motor temperature estimating section for calculating an estimated temperature of the motor from at least a current supplied to the motor, an outside air temperature and a vehicle speed, based on heat balance relationship; and a comparator which transmits the operation inhibiting signal to the motor drive section when the estimated temperature of the motor calculated by the motor temperature estimating section is higher than a predetermined temperature, which is equal to or lower than an operation allowable temperature of the motor.

With such a configuration, the temperature of the motor can be precisely estimated by using the vehicle speed as a parameter.

In the alignment changing control device according to the first aspect, it is preferred that the motor temperature estimating section calculates the estimated temperature of the motor by using the outside air temperature corrected in proportion to the square of the vehicle speed.

With such a configuration, the temperature of the motor can be precisely estimated by using the outside air temperature corrected in proportion to the square of the vehicle speed.

To achieve the second object of the present invention, an alignment changing control device according to a second aspect of the present invention is provided for controlling the driving of an electric actuator which changes the alignment angle of wheels of a vehicle, the electric actuator being mounted on the vehicle and exposed to the outside air. The alignment changing control device comprising a motor drive section which adjusts electrical power supplied to a motor of the electric actuator according to an operation command from outside and, when receiving an operation inhibiting signal, limits or stops supplying the electrical power to the motor. The alignment changing control device further comprising a motor temperature estimating section for calculating an estimated temperature of the motor from at least a current supplied to the motor and an outside air temperature, based on heat balance relationship, a comparator which transmits the operation inhibiting signal to the motor drive section when the estimated temperature of the motor calculated by the motor temperature estimating section is higher than a predetermined temperature, which is equal to or lower than an operation allowable temperature of the motor, and a power source voltage monitoring section which notifies, when a power source voltage supplied to the alignment changing control device equals to or lower than a predetermined voltage, at least the comparator that the power source voltage is dropped, in which upon receiving the notification that the power source voltage is dropped, the comparator stores the estimated temperature of the motor at that point in a nonvolatile memory; and in which the motor temperature estimating section uses the estimated temperature of the motor stored in the nonvolatile memory as an initial value of the estimated temperature of the motor when the vehicle is started.

With such a configuration, even when the motor is restarted shortly after stop, the motor can be prevented from burning out. Further, since the nonvolatile memory is used, the battery power can be saved when the vehicle is stopped.

In the alignment changing control device according to the second aspect, it is preferred that the nonvolatile memory is arranged outside of the alignment changing control device.

With such a configuration, the configuration of the alignment changing control device can be simplified.

In the alignment changing control device according to the first and second aspects, it is preferred that when receiving an operation inhibiting signal, the motor drive section limits or stops supplying the electrical power to the motor at a predetermined time interval.

With such a configuration, if the temperature of the motor is close to a predetermined threshold, the case where the motor is frequently switched between an operation state and a non-operation state can be prevented.

In the alignment changing control device according to the first and second aspects, it is preferred that once the comparator transmits the operation inhibiting signal, the comparator keeps transmitting the operation inhibiting signal until the estimated temperature of the motor becomes lower than the second predetermined temperature which is lower than the predetermined temperature.

With such a configuration, if the temperature of the motor is close to the predetermined threshold, the case where the motor is frequently switched between an operation state and a non-operation state can be prevented.

DETAILED DESCRIPTION OF PREFERRED EMBODIMENT(S)

The preferred embodiment (referred to as "embodiment" hereinafter) will be described below with reference to the attached drawings. In the present embodiment, an alignment changing control device according to the present invention is explained by using an example in which the alignment changing control device is a toe angle changing control ECU for controlling the operation of an electric actuator (referred to as "actuator" hereinafter) which changes the toe angle of rear wheels of a vehicle.

(Steering System)

Figure 1:
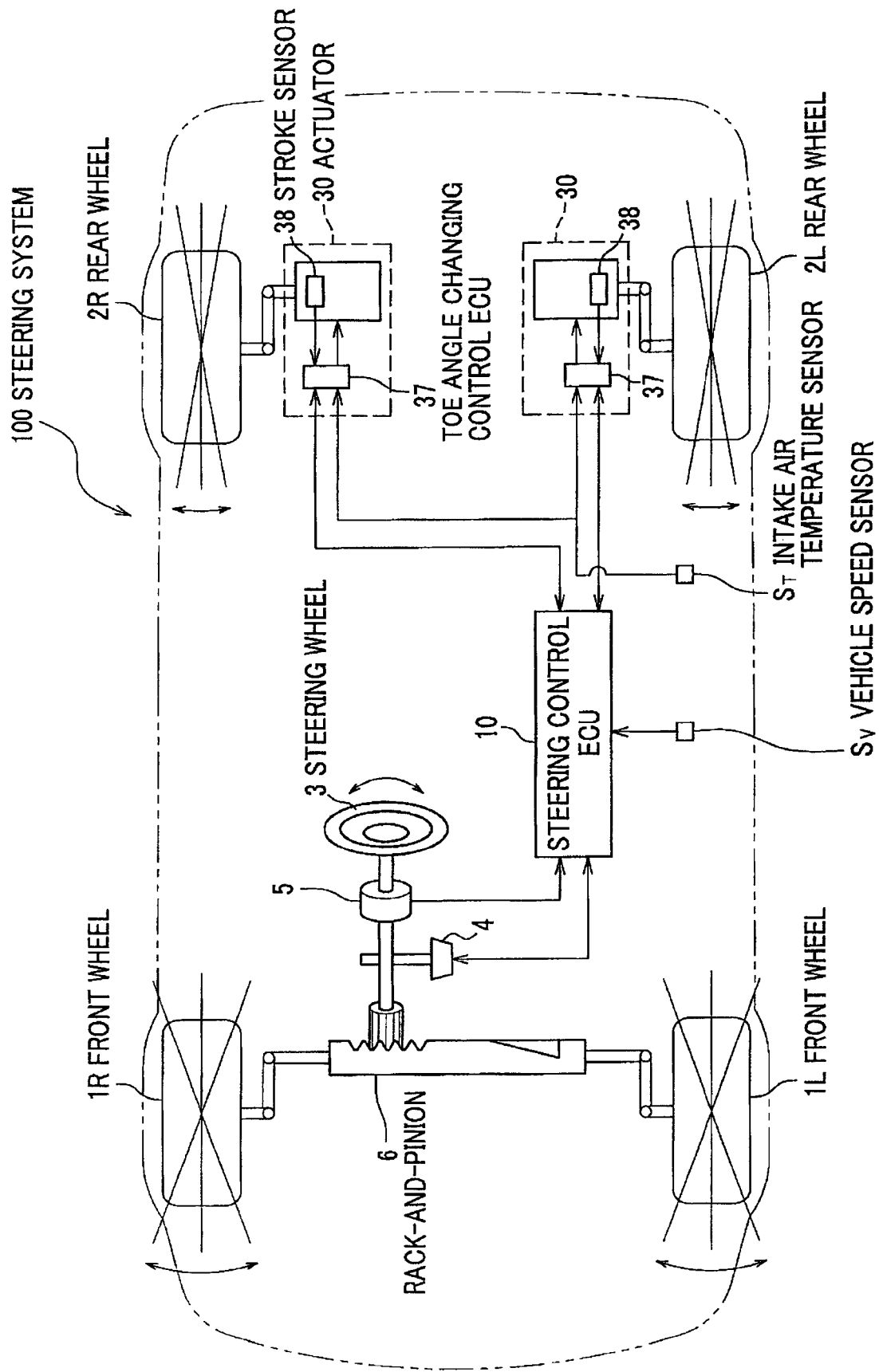
FIG. 1 is a view showing the construction of a steering system having a toe angle changing control ECU according to an embodiment of the present invention.

FIG. 1 is a view showing the construction of a steering system 100 having a toe angle changing control ECU according to the present embodiment. As shown in FIG. 1, the steering system 100 includes a front wheel steering system and a rear wheel steering system. The front wheel steering system steers left and right front wheels 1L, 1R in accordance with the operation of a steering handle 3. The rear wheel steering system steers left and right rear wheels 2L, 2R in accordance with an operation command outputted by a steering control ECU 10, where the steering control ECU 10 outputs the operation command in accordance with a steering angle of the left and right front wheels 1L, 1R and the vehicle speed.

The front wheel steering system includes the steering handle 3, a steering torque/steering angle sensor 5 which detects a steering torque input through the steering handle 3 and detects a steering angle of the left and right front wheels 1L, 1R, an assisting motor 4 which applies an assisting torque (which is an assisting force) to a steering shaft which has the steering handle 3 fixed to one end thereof, and a rack-and-pinion 6 which inputs a torque of the steering shaft to steer the left and right front wheels 1L, 1R.

Herein, the steering torque detected by the steering torque/steering angle sensor 5 is transmitted to the steering control ECU 10, and the steering control ECU 10 calculates the assisting torque applied to the steering shaft and transmits a control signal corresponding to the calculated assisting torque to the assisting motor 4.

On the other hand, the rear wheel steering system includes an actuator 30 which steers each of the left and right rear wheels 2L, 2R, and a suspension having a link mechanism for transmitting the operation of the actuator 30 to the left and right rear wheels 2L, 2R. A stroke sensor 38 for detecting a movement amount of the actuator 30 is provided in the actuator 30. Further, the toe angle changing control ECU 37 for controlling the operation of the actuator 30 is electrically connected to the actuator 30. Also connected to the toe angle changing control ECU 37 is an intake air temperature sensor $S_T$ attached to an air flow meter (not shown), an air cleaner box (not shown) or the like to transmit a temperature signal $T_{out}$, which corresponds to the temperature of vehicle atmosphere, to the toe angle changing control ECU 37.

Herein, a vehicle speed sensor $S_V$ for detecting the vehicle speed is connected to the steering control ECU 10. Based on the steering angle detected by the steering torque/steering angle sensor 5 and the vehicle speed detected by the vehicle speed sensor $S_V$, the steering control ECU 10 calculates a steering amount of the left and right rear wheels 2L, 2R, and transmits a command signal corresponding to the calculated result to the toe angle changing control ECU 37 of each of the both actuators 30. After receiving the command signal, the toe angle changing control ECU 37 makes the actuator 30 to operate to steer the left and right rear wheels 2L, 2R, while the movement amount of the actuator 30 is fed back from the stroke sensor 38.

Incidentally, in the steering torque/steering angle sensor 5, the steering angle is calculated by detecting the rotation angle of the assisting motor 4. Further, the steering torque is calculated by detecting the change of a magnetic field generated by a magnetic film formed on the steering shaft, where the change of the magnetic field generated by the magnetic film formed on the steering shaft is detected by detecting an inductance change of a detection coil facing the steering shaft. Further, in the vehicle speed sensor $S_V$, the vehicle speed is calculated by detecting a vehicle speed signal $V_{car}$, which is pulse number per unit time generated while the axle is rotating.

Note that, in the steering system 100 shown in FIG. 1, although the steering control ECU 10 and the toe angle changing control ECU 37 are connected with respective sensors through independent signal wires, these components also can be connected with each other through a bus system in-vehicle network such a CAN (Controller Area Network).

(Rear Wheel Steering System)

Figure 2:
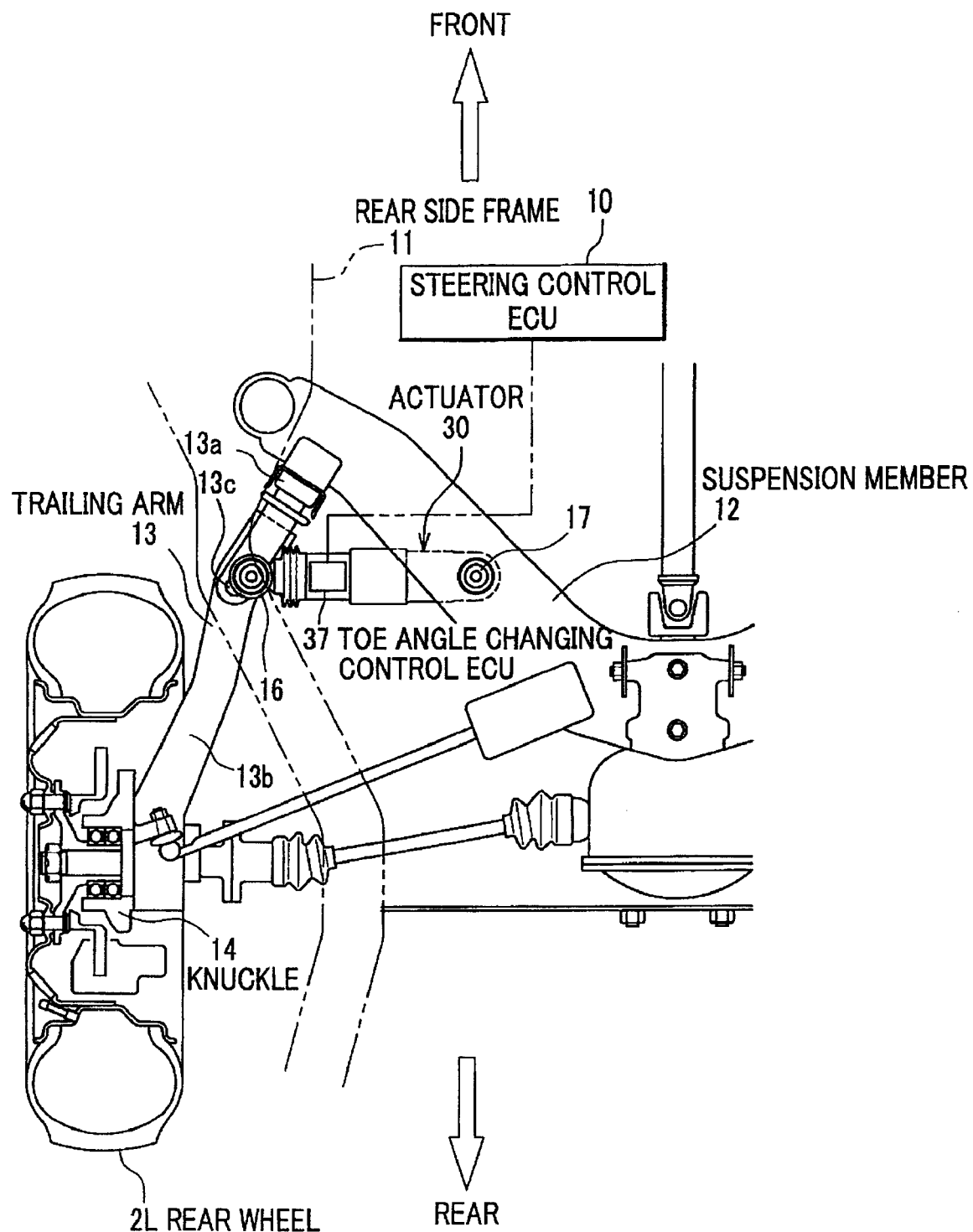
FIG. 2 is a view showing the construction of a suspension for suspending a left rear wheel 2L.

In the present embodiment, the left and right rear wheels 2L, 2R are suspended by a semi-trailing arm type suspension having a link mechanism. Herein, FIG. 2 is a view showing the construction of the suspension suspending the left rear wheel 2L. Note that, in the suspension shown in FIG. 2, the arms or the like unrelated to changing operation of the toe angle are not shown. Although FIG. 2 only shows the suspension which suspends the left rear wheel 2L, it should be understood that a suspension which suspends the right rear wheel 2R is also provided in a symmetrical manner.

In the suspension shown in FIG. 2, a vehicle-width-direction-end-portion of a cross member 12 substantially extending in the vehicle width direction is elastically supported on a rear side frame 11 of the vehicle body. A front end of a trailing arm 13 substantially extending in the vehicle longitudinal direction is supported in the vicinity of the vehicle width direction end portion of a cross member 12. The left rear wheel 2L is fixed to the rear end of the trailing arm 13.

In the trailing arm 13, a body side arm 13a mounted on the cross member 12 and a wheel side arm 13b fixed to the left rear wheel 2L are connected with each other through a rotary shaft 13c substantially extending in the vertical direction. With such an arrangement, the trailing arm 13 can be displaced in the vehicle width direction.

The actuator 30 has one end thereof attached to a front end portion of the wheel side arm 13b through a ball joint 16, and has the other end thereof attached to the cross member 12 through a ball joint 17, the position of the front end portion of the wheel side arm 13b being closer to the vehicle front side than the rotary shaft 13c.

(Actuator)

Figure 3:
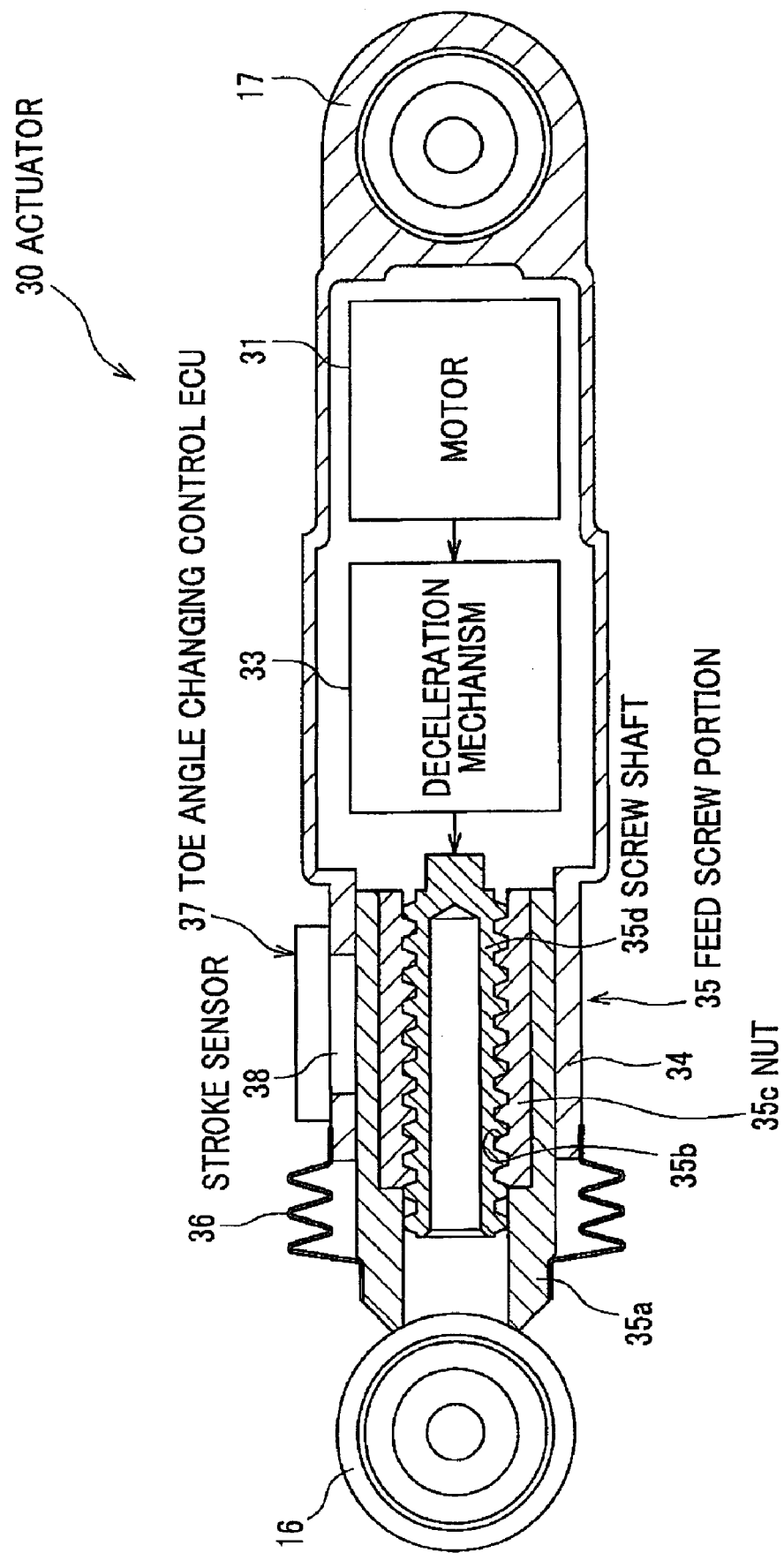
FIG. 3 is a view showing the construction of an actuator.

FIG. 3 is a view showing the construction of the actuator 30. As shown in FIG. 3, the actuator 30 includes a motor 31, a deceleration mechanism 33, a feed screw portion 35 and the like.

The motor 31 may be a brush motor, a brushless motor or the like rotatable in both the positive and reverse directions.

The deceleration mechanism 33 is formed by combining two sets of planetary gears (not shown) or the like.

The feed screw portion 35 includes a cylindrical rod 35a, a nut 35c formed with a screw groove 35b, and a screw shaft 35d engaging with the screw groove 35b, the nut 35c being inserted into the rod 35a, the screw shaft 35d movably supporting the rod 35a in the shaft direction. The screw shaft 35d, the deceleration mechanism 33 and the motor 31 are housed in a case 34 having a long and narrow shape. The deceleration mechanism 33 has one end thereof connected with the output shaft of the motor 31 and the other end thereof connected with the screw shaft 35d.

The power of the motor 31 is transmitted to the screw shaft 35d through the deceleration mechanism 33 so that the screw shaft 35d rotates, and thereby the rod 35a moves in the left and right direction of FIG. 3 (i.e., in the shaft direction) relative to the case 34. Further, a boot 36 is attached to the actuator 30 to prevent the ingress of foreign substance such as dust and water.

Further, a stroke sensor 38 for detecting the position of the rod 35a (i.e., the movement amount of the rod 35a) is attached to the actuator 30. For example, the stroke sensor 38 may have such a configuration in which the position of the rod 35a is detected using the magnetism of a built-in magnet. By detecting the position of the rod 35a with the stroke sensor 38, the toe angle (toe-in or toe-out) of the left and right rear wheels 2L, 2R can be accurately and individually detected.

As shown in FIG. 2, in the actuator 30, the ball joint 16 arranged at the tip end of the rod 35a is rotatably connected to the wheel side arm 13b of the trailing arm 13, and the ball joint 17 arranged at the base end of the case 34 is rotatably connected to the cross member 12.

The screw shaft 35d rotates driven by the motor 31, so that the rod 35a extends or contracts. When the rod 35a extends (to the left side of FIG. 3), the wheel side arm 13b is pushed toward the outside of the vehicle in the vehicle width direction (i.e., toward the left side of FIG. 2) so that the left rear wheel 2L is turned to the left; and when the rod 35a contracts (to the right side of FIG. 3), the wheel side arm 13b is pulled toward the inside of the vehicle in the vehicle width direction (i.e., toward the right side of FIG. 2) so that the left rear wheel 2L is turned to the right.

It should be noted that the ball joint 16 of the actuator 30 does not have to be attached to the wheel side arm 13b, but can be attached to other position as long as the toe angle of the left and right rear wheels 2L, 2R can be changed. For example, the ball joint 16 also can be attached to a knuckle. Further, in the present embodiment, the left and right rear wheels 2L, 2R are described using an example where the left and right rear wheels 2L, 2R are suspended by a semi-trailing arm type suspension, the left and right rear wheels 2L, 2R of the present invention does not have to be limited thereto but can be suspended by other type suspension.

Further, the toe angle changing control ECU 37 is integrated with the actuator 30. The toe angle changing control ECU 37 is fixed to the case 34 of the actuator 30. Specifically, the toe angle changing control ECU 37 is connected to the case 34 through the stroke sensor 38 and a connector. Incidentally, the functional constitution of the toe angle changing control ECU 37 will be described later.

The toe angle changing control ECU 37 is powered by a power source such as a battery (not shown) mounted on the vehicle. Further, the steering control ECU 10 and the assisting motor 4 are powered by a power source such as a battery (not shown) in a system separated from the above power source.

(Steering Control ECU)

The function of the steering control ECU 10 will be described below. The steering control ECU 10 includes a computer (not shown) having a CPU (Central Processing Unit, a ROM (Read Only Memory) and a RAM (Random Access Memory), a program, and peripheral circuits. Function of calculating the controlled variable of the assisting motor 4 and function of calculating the operation command output to the toe angle changing control ECU 37 are achieved by executing the program.

First, the function of calculating the controlled variable of the assisting motor 4 will be described below. The steering control ECU 10 calculates an output torque target signal of the assisting motor 4 based on the steering torque output by the steering torque/steering angle sensor 5 and the vehicle speed signal $V_{car}$ output by the vehicle speed sensor $S_V$. Based on the steering torque and the vehicle speed signal $V_{car}$, the target signal is calculated by referring to a base table previously created based on experimental measurement. The target signal calculated by the steering control ECU 10 is input to the assisting motor 4. The assisting motor 4 applies the assisting torque to the steering shaft based on the target signal.

Next, the function of calculating the operation command $S_C$ output to the toe angle changing control ECU 37 will be described below. The steering control ECU 10 calculates the steering angle of the front wheels based on the rotation angle output from the steering torque/steering angle sensor 5. Further, the target value of the toe angle of each of the left and right rear wheels 2L, 2R is calculated based on the vehicle speed signal $V_{car}$ output by the vehicle speed sensor $S_V$ and the steering angle of the left and right front wheels 1L, 1R. Based on the steering angle and the vehicle speed, the target value of the toe angle is calculated by referring to a previously created rear wheel steering angle table. As the operation command $S_C$, the target value of the toe angle calculated by the steering control ECU 10 is input to each of the toe angle changing control ECUs 37. Based on the input operation command $S_C$, the toe angle changing control ECU 37 drives the motor 31 (see FIG. 3) to steer the left and right rear wheels 2L, 2R.

Note that the present invention can not only be applied to the steering control ECU 10 of the present embodiment, but can be applied to various known steering control ECUs for four-wheel steering system.

(Toe Angle Changing Control ECU)

The construction of the toe angle changing control ECU 37 will be described below with reference to FIGS. 4 and 5.

Figure 4:
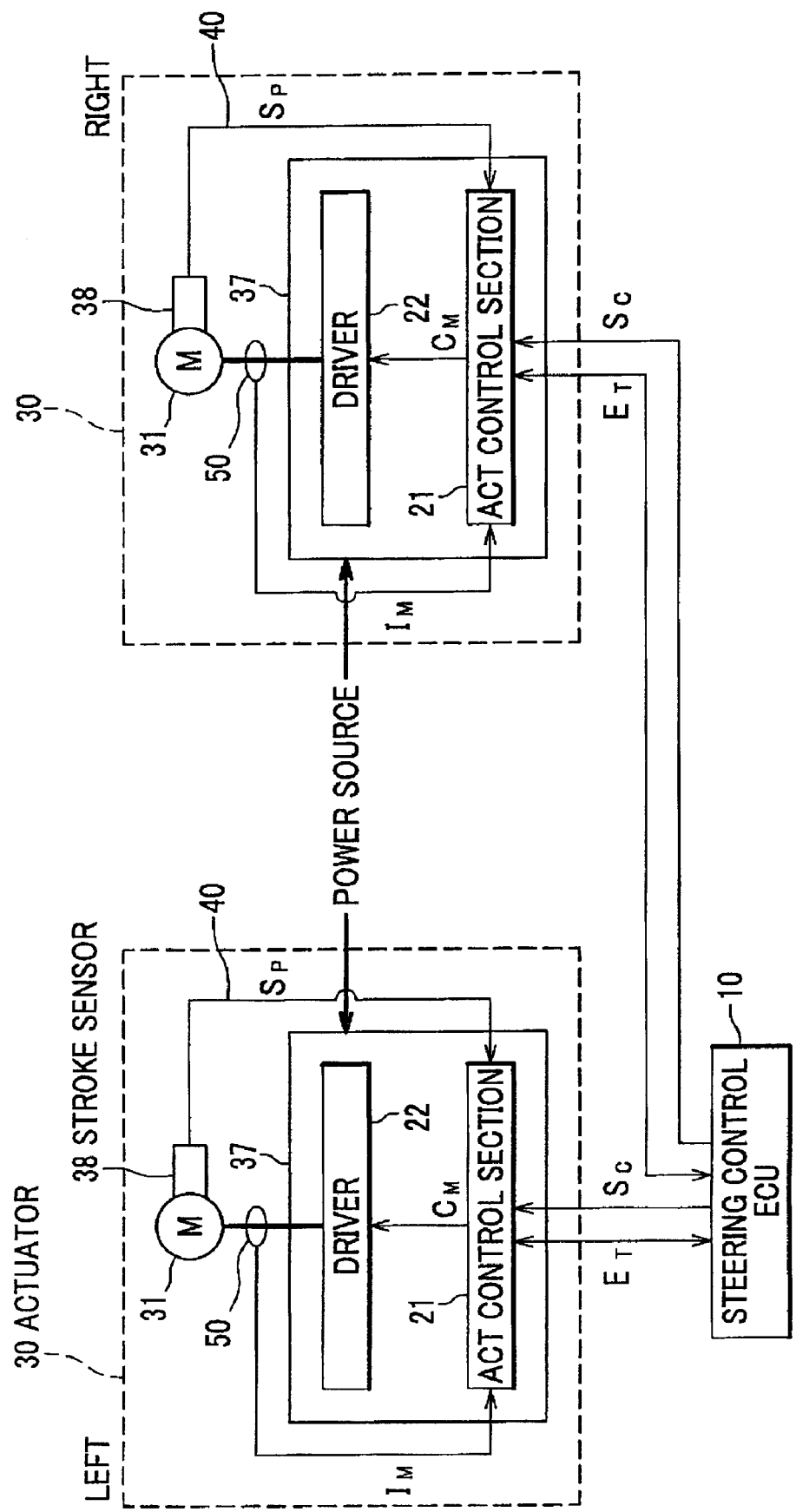
FIG. 4 is a diagram showing functional blocks of the actuators and steering control ECUs on the left and right sides.

FIG. 4 is a diagram showing functional blocks of the actuators and steering control ECUs on the left and right sides. The toe angle changing control ECU 37 has a function of drive-controlling the actuator 30 (the motor 31), and includes an actuator control section 21 (referred to as "ACT control section" hereinafter) and a driver 22. Each of the toe angle changing control ECUs 37 is connected with the steering control ECU 10 through a communication wire.

The ACT control section 21 calculates the drive amount of the motor 31 according to the operation command transmitted from the steering control ECU 10 and, based on the calculated result, outputs a motor drive signal $C_M$ to the driver 22 for driving the motor 31. The motor drive signal $C_M$ includes a current value of the current supplying to the motor 31 and a current direction in which the current flows. The driver 22 includes a FET (Field Effect Transistor) bridge circuit. The driver 22 applies a voltage to the motor 31 based on the motor drive signal.

Figure 5:
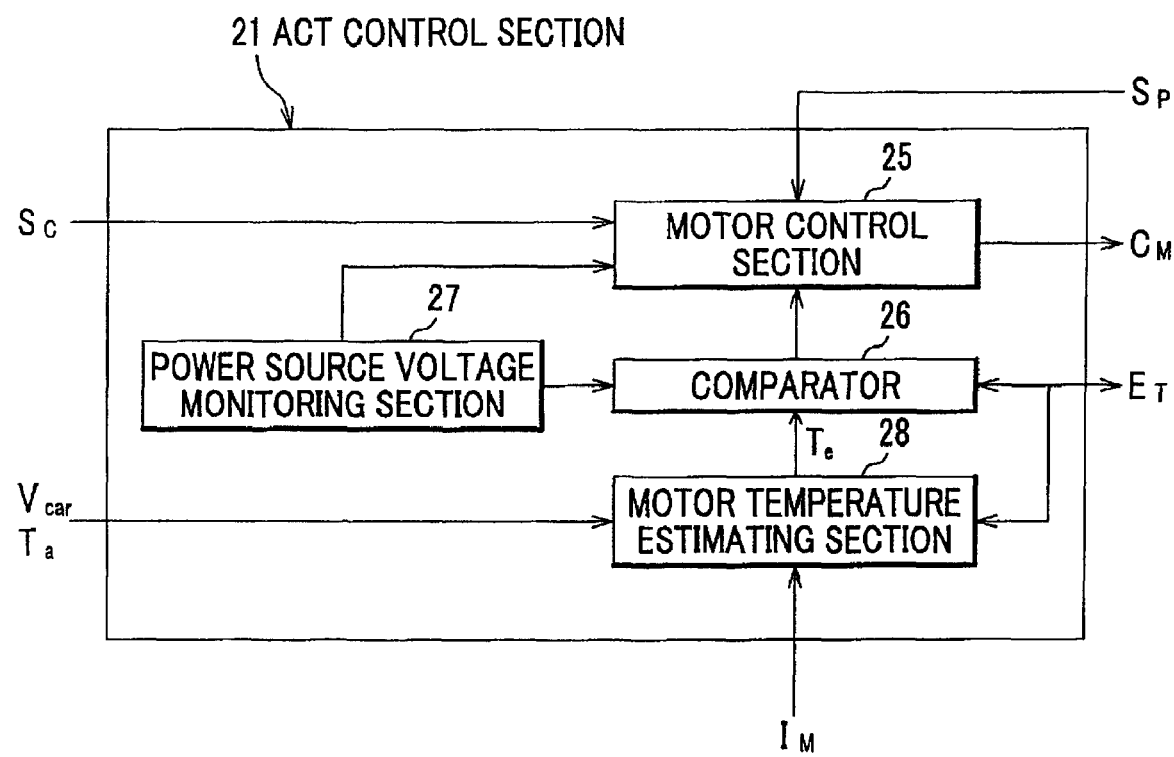
FIG. 5 is a diagram showing functional blocks of an ACT control section.

FIG. 5 is a diagram showing functional blocks of the ACT control section 21 of the toe angle changing control ECU 37. As shown in FIG. 5, the ACT control section 21 has a motor control section 25, a comparator 26, a power source voltage monitoring section 27, and a motor temperature estimating section 28 as functional blocks. The ACT control section 21 includes a computer (not shown) having a CPU, a ROM and a RAM, a program, and peripheral circuits, and the functions of the motor control section 25, the comparator 26, the power source voltage monitoring section 27 and the motor temperature estimating section 28 are achieved by executing the program.

Each of the functional sections of the ACT control section 21 will be described below.

Based on the operation command $S_C$ (which is a target value signal of the toe angle of the left rear wheel 2L (or right rear wheel 2R)) input from the steering control ECU 10, the motor control section 25 calculates the motor drive signal $C_M$ by using a position signal $S_P$ obtained from the stroke sensor 38 as a feedback signal, and transmits the calculated motor drive signal $C_M$ to the driver 22. Further, the motor control section 25 is connected with the comparator 26. When receiving an operation inhibiting signal (which will be discussed later) from the comparator 26, the motor control section 25 stops transmitting the motor drive signal $C_M$ to the driver 22. Incidentally, the motor drive section mentioned in the claims corresponds to the motor control section 25 and the driver 22.

The comparator 26 compares a predetermined temperature, which is set within an operation allowable temperature range of the motor 31, with an estimated temperature $T_e$ of the motor 31 transmitted from the motor temperature estimating section 28, and transmits the operation inhibiting signal to the motor control section 25 when the estimated temperature $T_e$ is equal to or higher than the predetermined temperature. Further, the comparator 26 stores the estimated temperature $T_e$ at time when the voltage is dropped in a nonvolatile memory (not shown).

The power source voltage monitoring section 27 monitors the power source voltage supplied by the battery mounted on the vehicle and, when the power source voltage equals to or lower than the predetermined voltage, notifies the motor control section 25 and the comparator 26 that the voltage is dropped, so that a below-mentioned interrupt processing is started.

The motor temperature estimating section 28 calculates the estimated temperature $T_e$ of the motor 31 based on the temperature signal $T_{out}$ of the vehicle atmosphere received from the intake air temperature sensor $S_T$, the vehicle speed signal $V_{car}$ received from the vehicle speed sensor $S_V$ and a motor current signal $I_M$ detected by using a Hall current sensor 50, and transmits the calculated estimated temperature $T_e$ of the motor 31 to the comparator 26. Incidentally, the method for calculating the estimated temperature of the motor 31 will be discussed later.

(Operation of Toe Angle Changing Control ECU)

Figure 6:
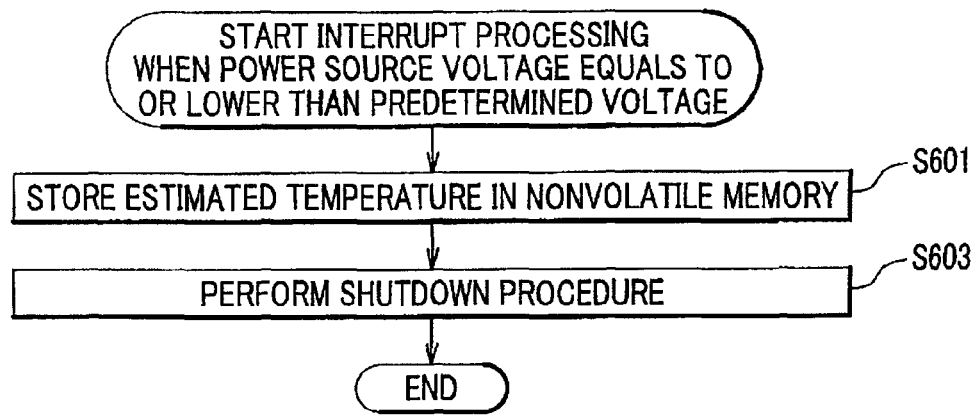
FIG. 6 is a flowchart explaining an interrupt processing executed by the toe angle changing control ECU.

The processing operation of the toe angle changing control ECU 37 will be described below with reference to FIGS. 6 and 7, and FIGS. 4 and 5 sometimes. FIG. 6 is a flowchart explaining the interrupt processing executed by the toe angle changing control ECU 37, and FIG. 7 is a flowchart explaining a control processing of a motor constantly executed by the toe angle changing control ECU 37 when the vehicle in traveling.

Figure 7:
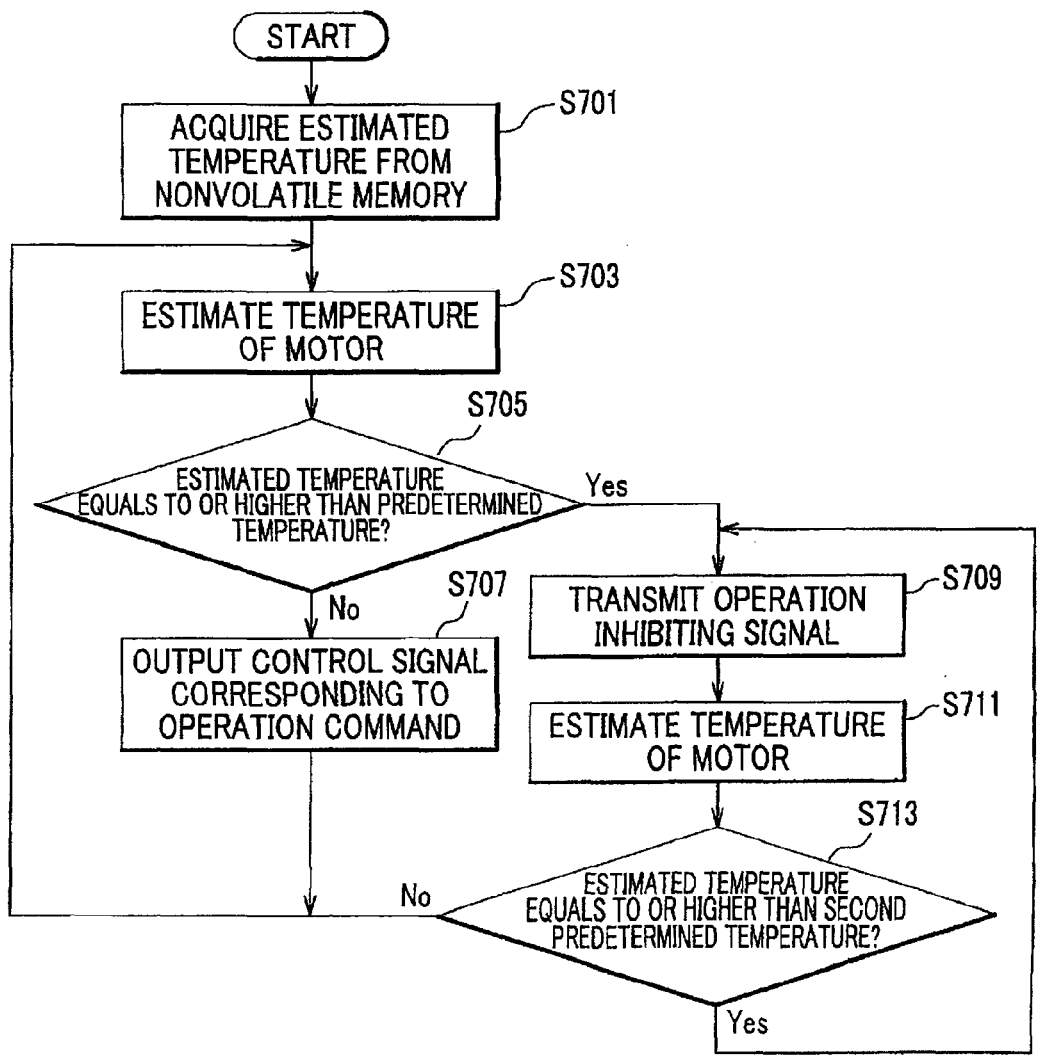
FIG. 7 is a flowchart explaining a control processing of a motor executed by the toe angle changing control ECU.

The power source voltage monitoring section 27 constantly monitors the power source voltage supplied by the battery mounted on the vehicle and, when the power source voltage equals to or lower than the predetermined voltage, notifies the motor control section 25 and the comparator 26 that the voltage is dropped, thereby the interrupt processing of the flowchart shown in FIG. 7 for controlling the motor 31 is started as the processing shown in FIG. 6. Incidentally, the predetermined voltage is a threshold for judging that the supply of the electric power from the battery mounted on the vehicle is stopped when switching off the ignition switch (not shown) of the vehicle. Taking into consideration the voltage drop of the battery when the vehicle is normally traveling, the predetermined voltage is set to, for example, 11V.

Next, the comparator 26 stores the estimated temperature $T_e$ at this time in the nonvolatile memory (not shown) as an estimated-temperature-at-time-when-voltage-is-dropped $E_T$ (Step S601). The nonvolatile memory, in which the estimated-temperature-at-time-when-voltage-is-dropped $E_T$ is stored, may be provided within the toe angle changing control ECU 37 or within the steering control ECU 10. Further, instead of providing the nonvolatile memory within the toe angle changing control ECU 37 or within the steering control ECU 10, the estimated-temperature-at-time-when-voltage-is-dropped $E_T$ may be stored in a separately provided nonvolatile memory shared by various ECUs of within vehicle.

By using the nonvolatile memory, it becomes unnecessary to supply a backup power source (continuous voltage: +B) to the motor temperature estimating section 28 or the steering control ECU 10 even when switching off the ignition switch of the vehicle, therefore the battery power can be saved. Further, by arranging the nonvolatile memory in the place other than the toe angle changing control ECU 37, the circuit configuration of the toe angle changing control ECU 37 can be simplified.

Next, in Step S603, the motor control section 25 performs a shutdown procedure to end the processing. The shutdown procedure may be, for example, transmitting a motor drive signal $C_M$ to the driver 22 to return the toe angles of the left and right rear wheels 2L, 2R to an initial value.

A control processing of the motor 31 executed by the toe angle changing control ECU 37 when the vehicle is normally traveling will be explained below with reference to FIG. 7, and FIGS. 4 and 5 sometimes. When the ignition switch (not shown) of the vehicle is switched on, the toe angle changing control ECU 37 starts the processing shown in the flowchart of FIG. 7.

First, the comparator 26 of the toe angle changing control ECU 37 acquires the estimated temperature (i.e., the estimated-temperature-at-time-when-voltage-is-dropped $E_T$) from the nonvolatile memory which is provided, for example, within the toe angle changing control ECU 37 or in the steering control ECU 10 (Step S701). The acquired estimated-temperature-at-time-when-voltage-is-dropped $E_T$ is the estimated temperature stored in Step S601 of FIG. 6, which shows a flowchart of the interrupt processing.

Next, the motor temperature estimating section 28 of the toe angle changing control ECU 37 estimates the temperature of the motor 31 (Step S703).

The method for calculating the estimated temperature of the motor 31 by the motor temperature estimating section 28 will be described below. Assuming that the thermal resistance of the motor 31 is $R_t$ [K/W], the internal resistance of the motor 31 is r [Ω], the heat radiation coefficient of the actuator 30 is h [W/K·m²] and the heat radiation area is a [m²], the estimated temperature $T_{en}$ of the motor 31 can be obtained according to the following equation (1), based on the heat balance relationship. Note that, in equation (1), the $T_{e(n-1)}$ is the estimated temperature of the motor 31 calculated in the previous time by the loop processing following Step S703. Further, if n=1, then the $T_{e(n-1)}$ (i.e., $T_{e0}$) presents the initial value of the temperature of the motor 31, which is set within a temperature range ranged from the temperature of the atmosphere up to the estimated-temperature-at-time-when-voltage-is-dropped $E_T$ acquired in Step S701.

$$T_{en} = T_{e(n-1)} + R_t r(I_M)^2 - R_t ah(T_{e(n-1)} - T_{out}) \tag{1}$$

It has been found that, in equation (1), the heat radiation coefficient h of the actuator 30 is a variable which changes according to the vehicle speed signal $V_{car}$, and that the heat radiation coefficient h can be preferably expressed as a function in proportion to the square of the vehicle speed signal $V_{car}$ based on an experimental analysis. Based on the above, the heat radiation coefficient h of the actuator 30 can be expressed by the following equation (2). Herein, k represents a proportional constant, and b represents an intercept. Both the proportional constant k and the intercept b are constants.

Note that the heat radiation coefficient h of the actuator 30 does not have to be obtained by calculating the equation (2), but also can be obtained by previously storing a table which shows correspondence relation between the vehicle speed signal $V_{car}$ and the heat radiation coefficient h, and referring to the vehicle speed signal $V_{car}$ from the table to determine the heat radiation coefficient h.

$$h = k(V_{car})^2 + b \tag{2}$$

The motor temperature estimating section 28 calculates the estimated temperature $T_{en}$ of the motor 31 by respectively substituting the temperature signal $T_{out}$ of the vehicle atmosphere received from the intake air temperature sensor $S_T$, the vehicle speed signal $V_{car}$ received from the vehicle speed sensor $S_V$ and a motor current signal $I_M$ detected by using a Hall current sensor 50 into equation (1) and equation (2), and transmits the calculated estimated temperature $T_{en}$ of the motor 31 to the comparator 26.

Next, the comparator 26 determines whether or not the estimated temperature $T_{en}$ transmitted from the comparator 26 is equal to or higher than the predetermined temperature (Step S705) Herein, the predetermined temperature is calculated by multiplying the operation allowable temperature of the motor 31 by a predetermined safety factor, and the upper limit of the predetermined temperature is the operation allowable temperature of the motor 31.

In Step S705, if it is determined that the estimated temperature $T_{en}$ is lower than the predetermined temperature (i.e., if it is determined "No" in Step S705), then the motor control section 25 outputs the motor drive signal CM, which corresponds to the operation command $S_C$ transmitted from the steering control ECU 10, to the driver 22 (Step S707) to repeat the processing from Step S703.

On the other hand, in Step S705, if it is determined that the estimated temperature $T_{en}$ is equal to or higher than the predetermined temperature (i.e., if it is determined "Yes" in Step S705), then the comparator 26 transmits the operation inhibiting signal to the motor control section 25. The motor control section 25, which has received the operation inhibiting signal, stops transmitting the motor drive signal $C_M$ to the driver 22, so that the operation of the motor 31 is stopped (Step S709).

The motor temperature estimating section 28 estimates the temperature of the motor 31 using the same method as Step S703 (Step S711).

Next, the comparator 26 determines whether or not the estimated temperature $T_{en}$ calculated in Step S711 is equal to or higher than a second predetermined temperature (Step S713). Herein, the second predetermined temperature is lower than the predetermined temperature used in Step S705. By setting the second predetermined temperature to a lower value, the case where the motor 31 is frequently switched between an operation state and a non-operation state is prevented.

In Step S713, if it is determined that the estimated temperature $T_{en}$ is lower than the second predetermined temperature (i.e., if it is determined "No" in Step S713), then it is returned to Step S703 to repeat the processing from Step S703.

On the other hand, in Step S713, if it is determined that the estimated temperature $T_{en}$ is equal to or higher than the second predetermined temperature (i.e., if it is determined "No" in Step S713), then it is returned to Step S709 to repeat the processing from Step S709.

Incidentally, the loop processing between Step S703 and Step S713 is repeatedly performed during travel at a predetermined time interval (for example, a time interval of 10 milliseconds) until the interrupt processing shown in FIG. 6 is performed when the supply voltage of the battery is dropped when switching off the ignition switch.

With the toe angle changing control ECU 37 of the present embodiment, the temperature of the motor 31 can be accurately estimated by using the temperature of the vehicle atmosphere and the vehicle speed as parameters for the temperature estimation. Thus, the motor 31 can be prevented from being burnout, and also, a suitable motor 31 can be selected.

Further, by storing the estimated temperature of the motor 31 in the nonvolatile memory at the time when switching off the ignition switch in the nonvolatile memory and using the stored estimated temperature as an initial value of the estimated temperature of the motor 31 when restarting the vehicle, the motor 31 can be prevented from being burnout even when the vehicle is restarted after a short stop time (namely, even when the vehicle is in a so called "hot start" situation).

Further, by storing the estimated temperature of the motor 31 in the nonvolatile memory, it becomes unnecessary to supply a backup power source when switching off the ignition switch of the vehicle, therefore the battery power can be saved.

(Modification)

The present invention is not limited to the toe angle changing control ECU 37 of the above embodiment, but should include various modifications.

For example, although in the above embodiment, the present invention is applied to the toe angle changing control ECU 37 for controlling the actuator 30 which adjusts the toe angles of the left and right rear wheels 2L, 2R, the present invention does not limited thereto but can be applied to any electric actuator mounted on the vehicle and exposed to the outside air, no matter what purpose the actuator is used for.

Further, in Step S709 of the flowchart of FIG. 7, when the operation inhibiting signal is transmitted to the motor control section 25, the operation of the motor 31 is stopped by the motor control section 25, but the present invention is not limited such a configuration. For example, the following configuration also can be adopted in which the motor control section 25 is provided with a limited operation mode, in which the steering speed of the rear wheels 2 is reduced and/or steering range is limited to smaller than usual, and the motor 31 is driven in the limited operation mode when the operation inhibiting signal is received. The motor control section 25, which has received the operation inhibiting signal, stops transmitting the motor drive signal $C_M$ to the driver 22, so that the operation of the motor 31 is stopped (Step S709). With such a configuration, since the operation of the motor 31 is limited, the motor 31 can be prevented from being burnout.

Further, in Step S709 of the flowchart of FIG. 7, when the operation inhibiting signal is received, the operation of the motor 31 is stopped by the motor control section 25 only within the loop, but the present invention is not limited such a configuration. For example, the following configuration also can be adopted in which the motor control section 25 is provided with a timer, so that the motor is stopped or brought into the limited operation mode at a predetermined time interval.

Further, the estimated temperature of the motor 31 does not have to be calculated according to equation (1), but can be calculated according to various other equations, based on the heat balance relationship. Further, in the above embodiment, an example is given in which the heat radiation coefficient h is corrected by using the vehicle speed signal $V_{car}$ is discussed as equation (2), there is another example in which the heat radiation coefficient h is a fixed value, and the temperature signal Tout of the vehicle atmosphere is corrected by using the vehicle speed signal $V_{car}$.

In such a case, the corrected temperature signal $T_C$ of the vehicle atmosphere can be expressed by the following equation (3) for example. By substituting the temperature signal $T_C$ for the temperature signal $T_{out}$ of equation (1), the estimated temperature $T_{en}$ of the motor 31 can be calculated. Incidentally, in the following equation (3), b and c are experimentally obtained constants.

$$T_c = T_{out}\{1 - b(V_{car} - c)^2\} \tag{3}$$

What is claimed is:

1. An alignment changing control device for controlling driving of an electric actuator which changes alignment angle of wheels of a vehicle, the electric actuator being mounted on the vehicle and exposed to outside air, the alignment changing control device comprising:

a motor drive section which adjusts electrical power supplied to a motor of the electric actuator according to an operation command from outside and, when receiving an operation inhibiting signal, limits or stops supplying the electrical power to the motor;

a motor temperature estimating section for calculating an estimated temperature of the motor from at least a current supplied to the motor and a vehicle atmosphere temperature, which is obtained by correcting an outside air temperature by a vehicle speed, based on heat balance relationship; and a comparator which transmits the operation inhibiting signal to the motor drive section when the estimated temperature of the motor calculated by the motor temperature estimating section is higher than a predetermined temperature, which is equal to or lower than an operation allowable temperature of the motor, wherein the motor temperature estimating section calculates the estimated temperature of the motor by using the outside air temperature corrected in proportion to the square of the vehicle speed.

2. The alignment changing control device according to claim 1, wherein when receiving an operation inhibiting signal, the motor drive section limits or stops supplying the electrical power to the motor at a predetermined time interval.

3. The alignment changing control device according to claim 1, wherein once the comparator transmits the operation inhibiting signal, the comparator keeps transmitting the operation inhibiting signal until the estimated temperature of the motor becomes lower than a second predetermined temperature which is lower than the predetermined temperature.

4. The alignment changing control device according to claim 1, wherein the motor temperature estimating section calculates the estimated temperature of the motor from at least the current supplied to the motor, the vehicle air temperature obtained by correcting the outer air temperature by the vehicle speed, a thermal resistance of the motor, an internal resistance of the motor, a heat radiation coefficient of the electric actuator, and a heat radiation area of the electric actuator, based on the heat balance relationship.

5. An alignment changing control device for controlling driving of an electric actuator which changes alignment angle of wheels of a vehicle, the electric actuator being mounted on the vehicle and exposed to outside air, the alignment changing control device comprising:
- a motor drive section which adjusts electrical power supplied to a motor of the electric actuator according to an operation command from outside and, when receiving an operation inhibiting signal, limits or stops supplying the electrical power to the motor;
- a motor temperature estimating section for calculating an estimated temperature of the motor from at least a current supplied to the motor and an outside air temperature, based on heat balance relationship;
- a comparator which transmits the operation inhibiting signal to the motor drive section when the estimated temperature of the motor calculated by the motor temperature estimating section is higher than a predetermined temperature, which is equal to or lower than an operation allowable temperature of the motor; and
- a power source voltage monitoring section which notifies, when a power source voltage supplied to the alignment changing control device is equal to or lower than a predetermined voltage, at least the comparator that the power source voltage is dropped, wherein
upon receiving the notification that the power source voltage is dropped, the comparator stores the estimated temperature of the motor at that point in a nonvolatile memory,
the motor temperature estimating section uses the estimated temperature of the motor stored in the nonvolatile memory as an initial value of the estimated temperature of the motor when the vehicle is started, and
wherein the motor temperature estimating section calculates the estimated temperature of the motor by using the outside air temperature corrected in proportion to the square of the vehicle speed.

6. The alignment changing control device according to claim 5, wherein the nonvolatile memory is arranged outside of the alignment changing control device.

7. The alignment changing control device according to claim 5, wherein when receiving an operation inhibiting signal, the motor drive section limits or stops supplying the electrical power to the motor at a predetermined time interval.

8. The alignment changing control device according to claim 5, wherein once the comparator transmits the operation inhibiting signal, the comparator keeps transmitting the operation inhibiting signal until the estimated temperature of the motor becomes lower than a second predetermined temperature which is lower than the predetermined temperature.

* * * * *